US006215984B1

(12) United States Patent
Figueras et al.

(10) Patent No.: US 6,215,984 B1
(45) Date of Patent: Apr. 10, 2001

(54) LUMINOUS ANTENNA AND RADIOCOMMUNICATION EQUIPMENT COMPRISING SUCH AN ANTENNA

(75) Inventors: Eric Figueras, Teloche; Axel Meyer, Le Mans, both of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/021,258

(22) Filed: Feb. 10, 1998

(30) Foreign Application Priority Data

Feb. 14, 1997 (FR) .................................................. 97 01747

(51) Int. Cl.[7] ........................................................ H04B 1/40

(52) U.S. Cl. ............................. 455/90; 343/702; 343/721

(58) Field of Search ..................................... 343/721, 702, 343/895; 455/19, 90, 550, 128, 129, 343, 347, 351; 40/546, 547; 396/267; 446/219

(56) References Cited

U.S. PATENT DOCUMENTS

| | | | | |
|---|---|---|---|---|
| 2,473,981 | * | 6/1949 | Wood | 343/721 |
| 2,522,189 | * | 7/1950 | Morrow | 343/721 |
| 3,108,277 | * | 10/1963 | Thomas | 343/721 |
| 4,039,894 | * | 8/1977 | Gardner, III | 315/76 |
| 4,247,858 | * | 1/1981 | Eichweber | 343/729 |
| 5,625,459 | * | 4/1997 | Driver | 356/446 |
| 5,905,475 | * | 5/1999 | Annamaa | 343/895 |
| 5,907,307 | * | 5/1999 | Bickert et al. | 343/702 |
| 5,915,855 | * | 6/1999 | Murase et al. | 40/546 |
| 5,917,453 | * | 6/1999 | Uchino et al. | 343/721 |
| 6,025,816 | * | 2/2000 | Den et al. | 343/895 |
| 6,054,966 | * | 4/2000 | Haapala | 343/895 |

FOREIGN PATENT DOCUMENTS 0716819A 4/1995 (JP) .

* cited by examiner

*Primary Examiner*—Edward F. Urban
*Assistant Examiner*—Congvan Tran
(74) *Attorney, Agent, or Firm*—Dicran Halajian

(57) ABSTRACT

The antenna, having the outward appearance of a pin, has a light source and comprises a light pipe (9) and a light-diffusing part (9T), the light source (10) being situated outside the antenna. The light pipe and the light-diffusing part are made into one; the light-diffusing part is formed by a treatment of a part of the surface, diffusing the light.

17 Claims, 3 Drawing Sheets

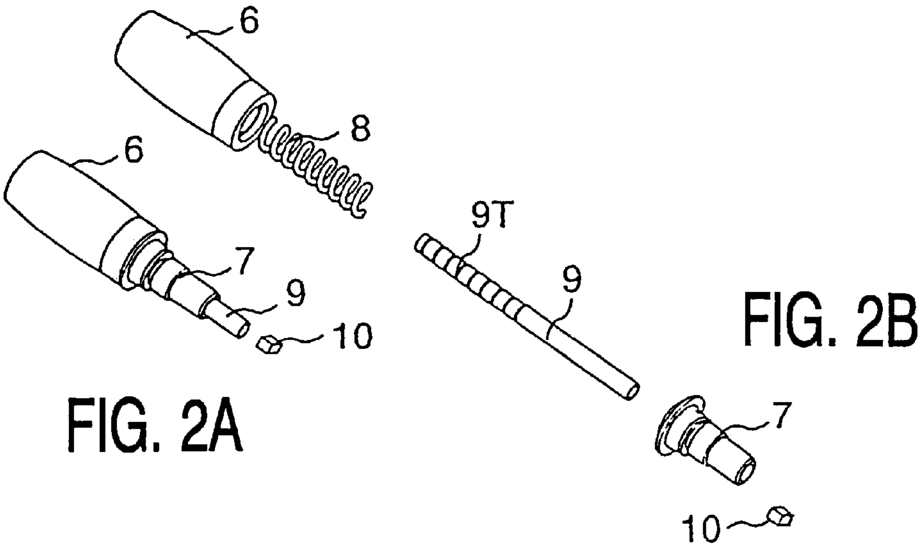
FIG. 2A
FIG. 2B
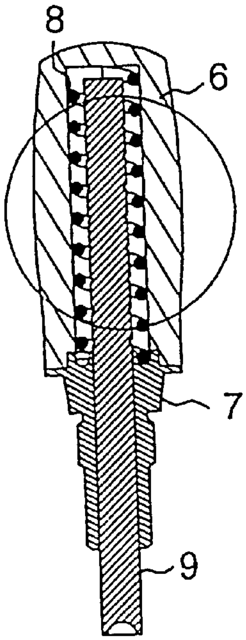
FIG. 3
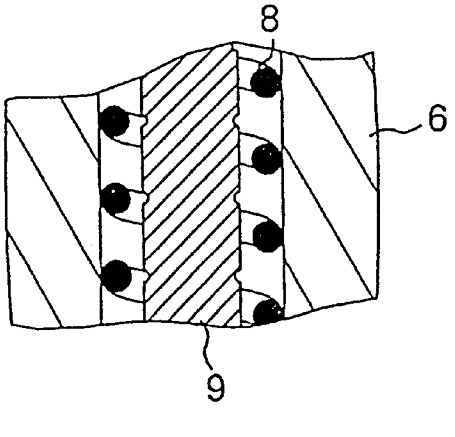
FIG. 4

LUMINOUS ANTENNA AND RADIOCOMMUNICATION EQUIPMENT COMPRISING SUCH AN ANTENNA

FIELD OF THE INVENTION

The present invention relates to an antenna intended for a radiocommunication transmitter/receiver, having the appearance of a pin, comprising a light source situated outside the antenna and comprising a light pipe with a light-diffusing part.

The invention also relates to a radiocommunication transmitter/receiver having an antenna.

The invention applies, for example, to cellular telephones.

BACKGROUND OF THE INVENTION

An antenna having a light source is described in U.S. Pat. No. 2,473,981 (Wood). The antenna described by this document comprises a light bulb which diffuses light in a transparent sleeve which surrounds the metallic electric conductor which forms the antenna itself.

SUMMARY OF THE INVENTION

It is an object of the invention to improve both the efficiency of the antenna, its reliability and its cost.

For this purpose, the antenna itself comprises a helical electric part formed by a metallic spring and at least partly surrounds the light pipe.

This permits to transmit light through the electric part of the antenna, without the latter blacking out the light.

In a particular embodiment, the light source produces light in the form of flashes.

Advantageously, the light pipe and the light-diffusing part are made into one, the light-diffusing part being formed by a treatment which renders the surface light-diffusing and which is applied to a part of the surface of the light pipe.

Preferably, the light-diffusing part is situated near to an end of the pin. The light signal is more visible in this way.

In a particular embodiment, the light-diffusing surface is surrounded by an envelope of translucent material.

The light pipe is advantageously formed by a bundle of flexible optical fibers.

In the case of a retractable antenna, this permits of making a loop with the fiber outside the antenna so that the loop is enabled to follow the movement of the antenna.

A radiocommunication transmitter/receiver advantageously includes an antenna according to the invention.

In a particular embodiment in which the transmitter/receiver is suitable for receiving a call, the transmitter/receiver comprises means for activating the light source when such a call is detected.

In another particular embodiment in which the transmitter/receiver has control keys, it comprises means for activating the light source when any key is pressed by a user.

These and other aspects of the invention will be apparent from and elucidated with reference to the embodiments described hereinafter.

BRIEF DESCRIPTION OF THE DRAWINGS

In the drawings:

FIG. 2A shows a perspective view of an assembled antenna according to the invention, FIG. 2B shows an exploded view of the same antenna shown in FIG. 2A, FIG. 3 represents a cross-sectional view of the antenna of FIGS. 2A–2B, FIG. 4 represents a part of FIG. 3 on a larger scale.

DETAILED DESCRIPTION OF THE INVENTION

Figure 1:
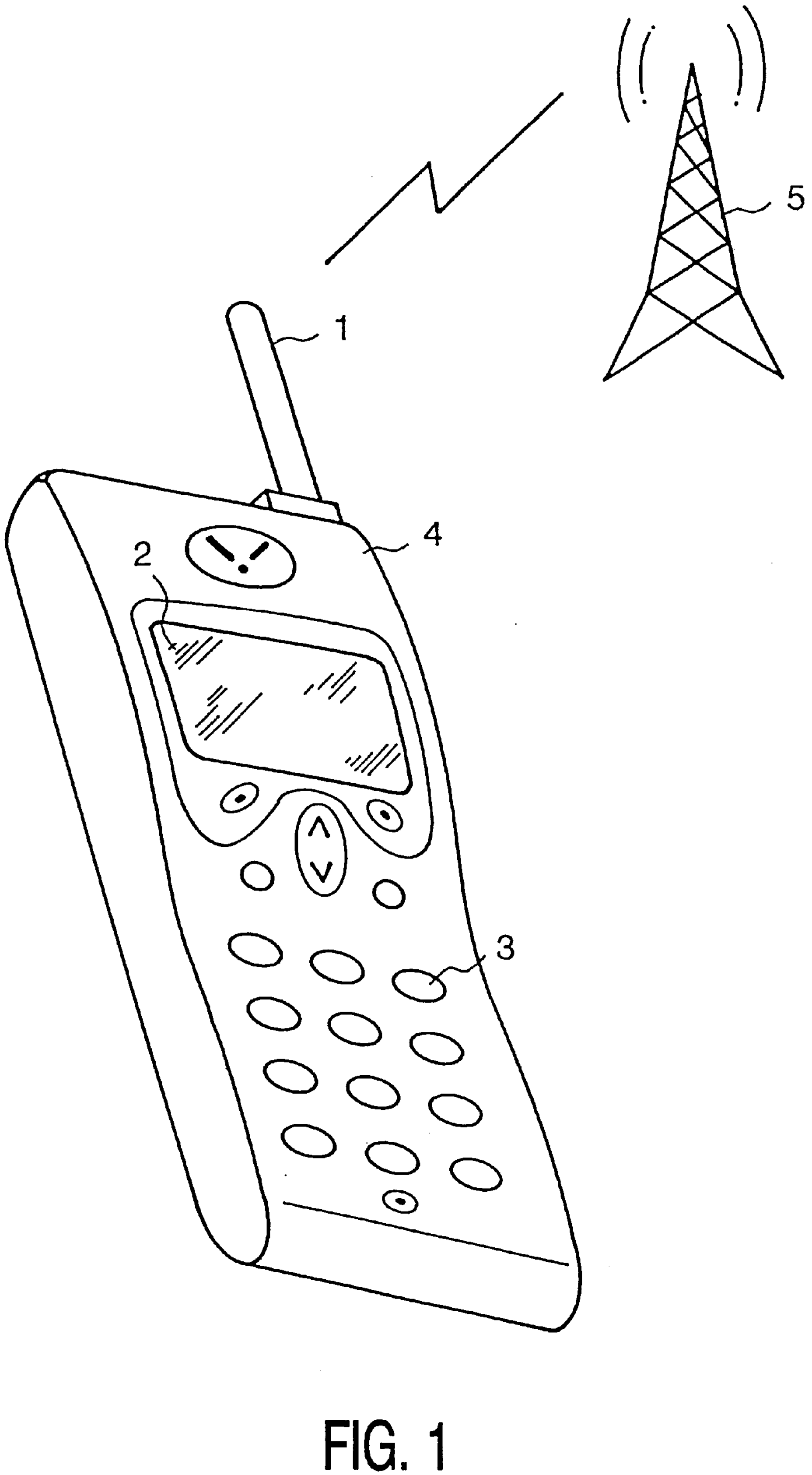
FIG. 1 represents a radiocommunication transmitter/receiver having an antenna.

The radiocommunication transmitter/receiver represented in FIG. 1, which is here a portable telephone, comprises a main body 4 with a keyboard 3 and a screen 2 and, for receiving (or transmitting) radio waves from (to) a transmitter 5, it includes an antenna which has the outward appearance of a pin, which further comprises a part 1 which may be rendered luminous.

This transmitter/receiver includes means which will be described hereinafter for activating the luminous part when an incoming call is detected, or when a key 3 is pressed by a user. The light may be produced in the form of flashes which attract the user's attention, for example, in the case of an incoming call.

An antenna for a transmitter/receiver such as that in FIG. 1 is represented in FIGS. 2A–2B.

The antenna represented in FIG. 2A comprises an envelope 6 made of a translucent material, and a mechanical support 7 which supports by any known means the envelope 6 and through which a light pipe 9 passes in which an electroluminescent diode 10 may send light.

In FIG. 2B, the same elements are represented alongside each other for the clarity of the representation. Furthermore, a metallic wire 8 in the form of a helical spring surrounds the light pipe and forms the electric part of the antenna.

The light pipe 9 is formed, for example, by a pin of transparent plastic material such as polymer. It comprises near to its end, that is to say, near to the end of the pin, inside the envelope 6 of a translucent material when the assembly is installed, a light-diffusing part 9T formed by a treatment of a part of the surface so that light is diffused. The treatment consists, for example, of providing annular grooves due to which the light is diffused from inside the pipe to the outside. A frosted part may also perform this role. The light pipe 9 and the light-diffusing part 9T form one part here.

The diffusing part could also comprise various separate elements spread over the length of the pipe to obtain special light effects. Obviously, at the end of the light pipe, an independent element could also be added to diffuse the light of the pipe.

In the case of a retractable antenna, the light pipe will also be formed by a flexible bundle of optical fibers.

In the cross-sectional view of FIG. 3, the translucent envelope 6, the metallic spring 8 which forms the electric part of the antenna and surrounds the light pipe 9, as well as the mechanical support 7 are represented as an assembly. A part of this antenna is represented on a larger scale in FIG. 4, making it possible to clearly show the annular grooves in the pipe 9 due to which the light inside the pipe is diffused to the outside between the whorls of the spring 8.

Figure 5:
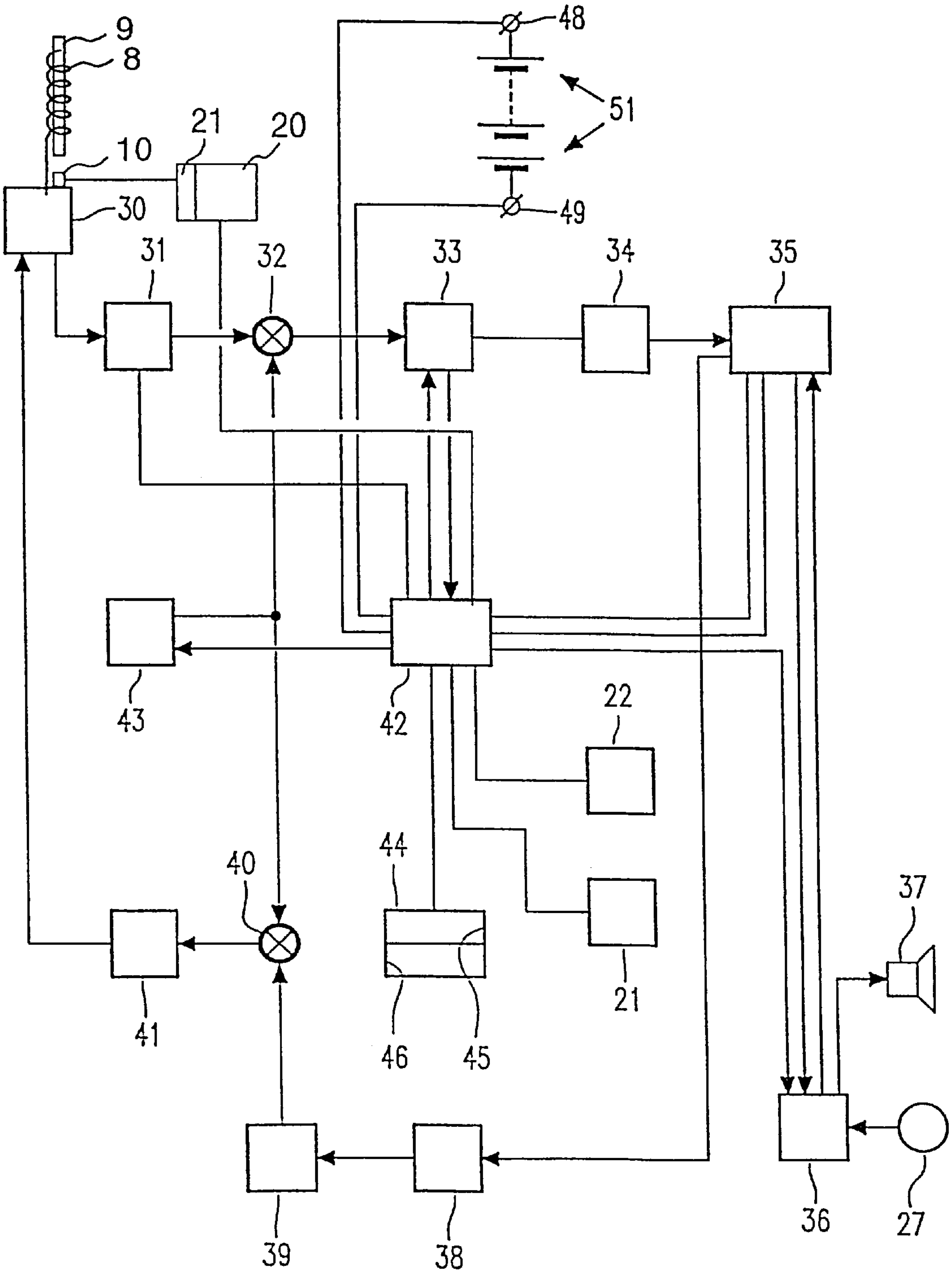
FIG. 5 is a general circuit diagram of a portable telephone.

A portable telephone as represented in FIG. 5 comprises a receiving circuit and a transmission circuit coupled both to an antenna duplexer 30. The receiving circuit comprises a cascaded adjustable RF filter 31, a mixer 32, a switchable intermediate-frequency filter 33, a detector 34, a time-division multiple access (TDMA) controller 35, a speech coder/decoder (CODEC) 36 and a loudspeaker 37. The transmission circuit comprises a cascaded combination of a microphone 27, the speech coder (CODEC) 36, the time-division multiple access (TDMA) controller 35, a modulator 38, an oscillator 39, a mixer 40 and a power amplifier 41. A microprocessor 42 is provided for controlling the functionalities of the telephone. Various conventional characteristic features such as controlling a synthesizer 43 for obtaining a channel that has a particular frequency, controlling the TDMA controller 35, sampling the keyboard 22 and controlling the display screen 21 will not be described in more detail here, because their operation is known per se. A memory 44 including a non-volatile part 45 and a volatile part 46 is associated to the microprocessor 42. The non-volatile part 45 of the memory contains a program that deals with the functionalities of the telephone. Moreover, the device comprises power supply leads 48 and 49 connected to an exchangeable battery 51 for supplying power to the device. The antenna comprises, as described above, an electric part in the form of a spring 8 which is connected to the antenna duplexer 30, and a light pipe 9 placed before a light source 10. The source 10 is fed by a supply module 20 which is activated by the microprocessor in one of the cases mentioned above. For the case where a light is desired in the form of flashes, the microprocessor may comprise a program for activating the module 20 in brief successive periods, or, as a variant, the module 20 may comprise a circuit of the flip-flop type 21 for activating the light source 10 in bursts.

What is claimed is:

1. An antenna intended for a radiocommunication transmitter/receiver, having the appearance of a pin, comprising a light source situated outside the antenna and the light pipe with a light diffusing part, wherein the antenna comprises a helical electric part formed by a metallic spring and wherein said metallic spring at least partly surrounds the pipe and an envelope of translucent material surrounding said metallic spring.

2. The antenna as claimed in claim 1, wherein the light source produces light in form of flashes.

3. An antenna as claimed in claim 1, wherein the light pipe and the light-diffusing part are made into one, the light-diffusing part being formed by a treatment which renders a surface light-diffusing, said surface being a part of of the light pipe.

4. An antenna as claimed in claim 1, wherein the light diffusing part is situated near to an end of the pin.

5. An antenna as claimed in claim 1, wherein the light pipe is formed by a bundle of flexible optical fibers.

6. A radiocommuniation transmitter/receiver including an antenna as claimed in claim 1.

7. A radiocommunication transmitter/receiver as claimed in claim 6, suitable for receiving a call, further comprising means for activating the light source when said call is detected.

8. A radiocommunication transmitter/receiver as claimed in claim 6, further comprising control keys, and means for activating the light source when any key of said control keys is pressed by a user.

9. An antenna comprising:

a light pipe having a light diffusing part at least one end of said antenna to diffuse light from inside said light pipe to outside said light pipe;

a light source located at another end of said antenna to illuminate said light pipe;

a conductive helical spring surrounding said light diffusing part and an envelope of translucent material surrounding said conductive helical spring.

10. The antenna of claim 9, wherein said light diffusing part includes annular grooves located on a surface of said light diffusing part.

11. The antenna of claim 9, wherein said light pipe is formed by a bundle of flexible optical fibers.

12. A portable communication device comprising:

a transceiver for receiving and transmitting calls;

an antenna connected to said transceiver; and a keyboard having a plurality of keys; wherein said antenna comprises:

a light pipe having a light diffusing part at one end of said antenna to diffuse light from inside said light pipe to outside said light pipe;

a light source located at another end of said antenna to illuminate said light pipe;

a conductive helical spring partially surrounding said light diffusing part; and an envelope of translucent material surrounding said conductive helical spring.

13. The portable communication device of claim 12, further comprising means for activating the light source when one of said calls is detected.

14. The portable communication device of claim 12, further comprising means for activating the light source when any key of said plurality of keys is pressed by a user.

15. The portable communication device of claim 12, wherein said light diffusing part includes annular grooves located on a surface of said light diffusing part.

16. The portable communication device of claim 12, wherein said light source produces flashes of light.

17. The portable communication device of claim 12, wherein said light pipe is formed by a bundle of flexible optical fibers.

* * * * *